United States Patent [19]
Schaenen

[11] 4,043,413
[45] Aug. 23, 1977

[54] PORTABLE AND COLLAPSIBLE BATHROOM-TYPE SCALE

[76] Inventor: Susan M. Schaenen, 145 Central Park West, New York, N.Y. 10023

[21] Appl. No.: 684,443

[22] Filed: May 7, 1976

[51] Int. Cl.² ...................... G01G 21/00; G01G 21/22
[52] U.S. Cl. .................................... 177/126; 177/263
[58] Field of Search ...................... 177/126, 127, 263; 73/431

[56] References Cited
U.S. PATENT DOCUMENTS 2,320,992  6/1943   Widmer ................................. 73/431
3,106,975  10/1963  Madigan ............................. 177/126

*Primary Examiner*—George H. Miller, Jr.
*Attorney, Agent, or Firm*—Robert C. Podwil

[57] ABSTRACT

A portable and collapsible scale includes a base plate, a weighing unit removably associated with the base plate, and an upper or platform plate removably associated with the weighing unit. A user may stand on the upper plate and view a weight read-out provided by the weighing unit.

9 Claims, 3 Drawing Figures

U.S. Patent    Aug. 23, 1977    4,043,413
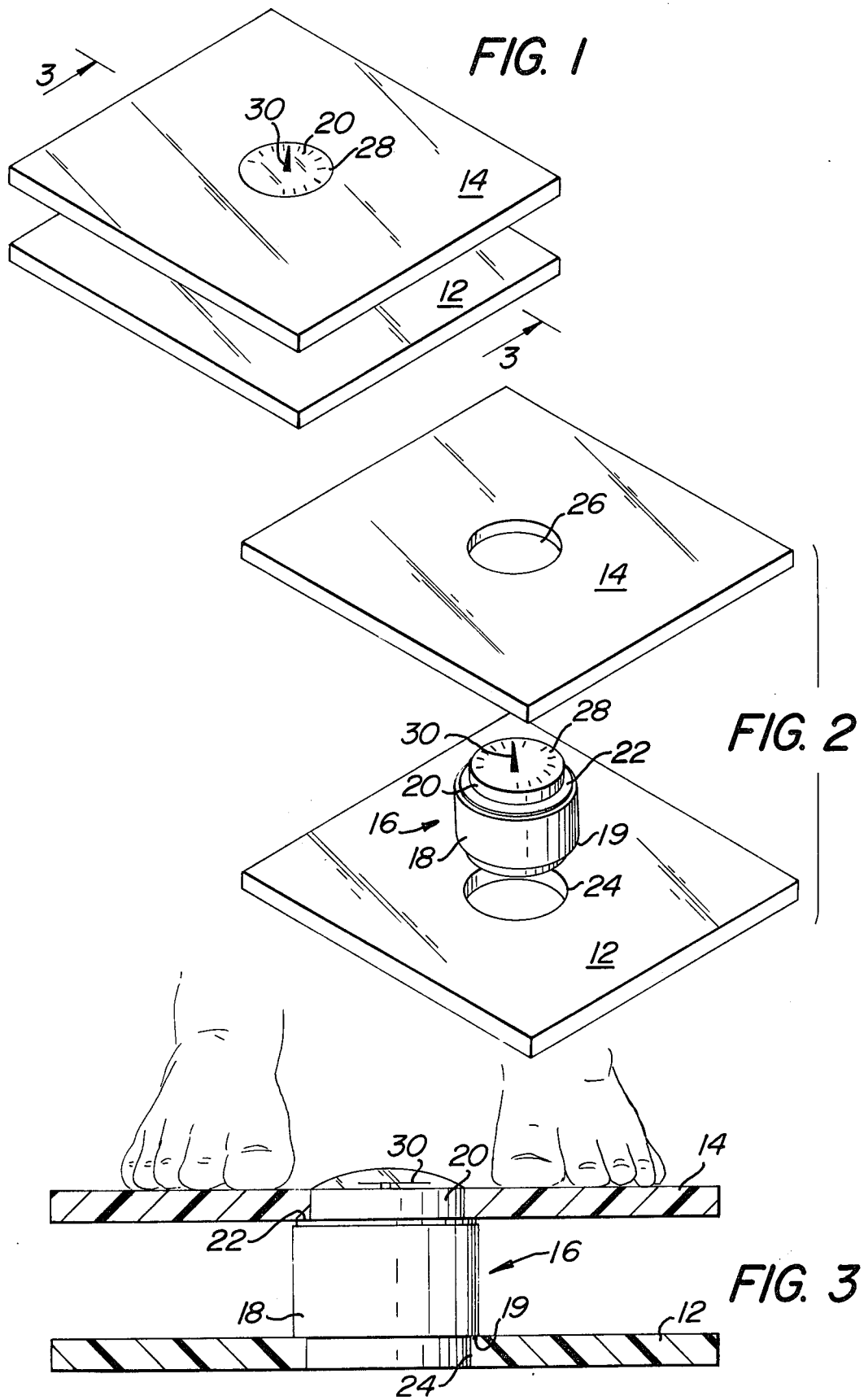

PORTABLE AND COLLAPSIBLE BATHROOM-TYPE SCALE

This invention relates to a portable and collapsible scale, and more particularly, a portable and collapsible bathroom-type scale made up of three compact sub-units, which may be readily assembled for use or disassembled for travel or storage. This invention further relates to a portable and collapsible scale sufficiently compact in its disassembled state to be conveniently carried in luggage.

Portable scales, as such, have heretofore been proposed. For example, in U.S. Pat. No. 3,106,975, issued Oct. 15, 1963, to D. M. Madigan, a collapsible scale is disclosed wherein a platform portion and a base portion are slidably interengaged, with a weighing unit, not shown, interconnecting or interposed between them. Hinged or removable extension panels are provided for the platform portion; extensions are provided to stablize and in effect broaden the base portion; and a weight read-out device is removably coupled to the base portion.

The present invention has as its general object, provision of an extremely simple, light and compact scale, having a bare minimum of parts or sub-units.

It is another object of this invention to provide a portable and collapsible scale which provides for ease of assembly and disassembly.

It is still another object of this invention to provide a portable and collapsible scale made up of easily assembled and disassembled sub-units, each of which is light and compact, and capable of being carried in conventional luggage.

Other objects will appear hereinafter.

The foregoing and other objects of the invention are realized, in a presently preferred form of the invention, by providing a base plate which in operation rests on a floor or other firm support surface, a weighing unit removably engageable with the base plate, and an upper, or platform plate, removably engageable with the weighing unit. The base plate, in the presently preferred form, is provided with a receptacle into which the weighing unit is simply placed, or perhaps friction fitted. The upper or platform plate, in the presently preferred form, rests loosely, or by friction fit, over the weighing unit, so that the entire scale may be assembled without the need for tools or special fasteners. Also, in the preferred form of the invention, the weighing unit includes a read-out, such as a dial or digital read-out, integral therewith, so that the portion of the weighing unit which receives the upper or platform plate extends through that plate and provides a weight read-out visable from above the upper plate.

For the purpose of illustrating the invention, there is shown in the drawings a form of the invention which is presently preferred, it being understood, however, that the invention is not limited to the precise arrangements and instrumentalities shown.

FIG. 1 is a perspective view showing a portable and collapsible scale in accordance with the invention, in its assembled and operative condition.

FIG. 2 is an exploded perspective view, showing the interrelationship of the various parts of the invention.

FIG. 3 is a cross-sectional view taken along the line 3—3 in FIG. 1.

Referring now to the drawings in detail, wherein like numerals indicate like elements, there is seen in FIG. 1 a portable and collapsible scale designated generally by the reference numeral 10.

The scale 10 comprises just three major components; namely: a bottom or base plate 12, an upper or platform plate 14, spaced from and parallel to the base plate 12 when operatively disposed, and a weighing unit 16, disposed between and interconnecting the base and upper plates 12 and 14.

In the illustrated form of the invention, the weighing unit 16 is generally cylindrical in cross-section, and includes a main body portion 18 of first cross-sectional dimension and an upper portion 20 extending upwardly from the main body portion 18 and having a reduced cross-sectional dimension. The transition between the main body portion 18 and upper portion 20, provides a generally horizontally extending shoulder 22, upon which the upper or platform plate 14 can rest.

With reference to FIGS. 2 and 3, the interrelationship between the weighing unit 16 and the base and platform plates 12 and 14 is seen.

The base plate 12 is provided with a receptacle 24 extending from its upper surface downwardly, through its thickness. The lower contour of the main body portion 18 of the weighing unit 16 is shaped, as by means of the shoulder 19, complementarily with the receptacle 24, and is either loosely or press-fitted into the receptable when the scale 10 is operatively disposed.

The upper or platform plate 14 is provided with an opening 26, the dimensions of which correspond to the cross-sectional shape and dimension of the upper portion 20 of the weighing unit 16. The upper portion 20 projects upwardly into the opening 26, so that the upper or platform plate 14 rests on the shoulder 22 of the weighing unit 16, and is supported by it. Weight applied to the upper or platform plate 14 is transmitted, it will be appreciated, to the shoulder 22, and then to the sensing mechanism (not shown) within the weighing unit 16 for translation to a numerical read-out; the dial 28 and pointer 30 in the illustrated form of the invention. The dial 28 and pointer 30 are visible from above the upper or platform plate 14. The dial 28 in the illustrated form is of the familiar circular type using a pointer 30 and graduated scale, but other suitable read-outs, such as, for example, linear scales, or even numeric (digital) read-outs, can be used to equal advantage.

In a presently preferred form of the invention, the base plate 12 and upper or platform plate 14 are made of acrylic plastic, of the type sold under the trademarks LUCITE or PLEXIGLAS and are of one-half inch thickness. Other equivalent materials selected for strength and lightness, may also be used. Suitable dimensions for the respective plates 12 and 14 are roughly 11 × 10 inches, although, the proportions can obviously be varied for specific applications. In the presently preferred form of the invention, the weighing unit 16 is cylindrical, and its main body portion 18 has a diameter of approximately 3 inches. The upper portion 20 has a diameter of approximately 2½ inches, and thus, the width of the shoulder 22 is approximately one-quarter of an inch.

The internal mechanism to be used in the weighing unit 16 is not, per se, an aspect of this invention, but conventional spring or hydraulic units, such as those illustrated, for example, in U.S. Pat. Nos. 2,960,329, issued to Hanssen on Nov. 15, 1960, and 3,743,040, issued to Hutchinson, et al, on July 3, 1973, could be adapted for this purpose. Other suitable weighing units, such as the hydraulic unit shown in U.S. Pat. No.

3,200,897, to Gibbons, issued Aug. 17, 1965 could also be used.

Disassembly of the scale is simply a matter of lifting the upper or platform plate 14 from the shoulder 22, and then removing the weighing unit 16 from the receptacle 24. The preferred height of the weighing unit is approximately 2½ inches. Scales capable of disassembly for travel are not, per se, novel. See: U.S. Pat. No. 3,106,975, to which reference was made above, and also U.S. Pat. No. 3,565,197, issued Feb. 23, 1971, to Carter; but with apparatus in accordance with the present invention, all of the components can readily be carried within conventional suitcases or even smaller pieces of luggage.

The sizes and shapes, however, of the base plate 12 and upper or platform 14 are such that they provide a stable base, capable of receiving and supporting the weight of a person during weighing.

Although the present invention is particularly useful as a travelling bathroom-type scale, it can obviously be used for other purposes to which scales may be put, while providing the advantages of portability and collapsibility.

I claim:

1. A portable and collapsible scale, comprising a base plate adapted to rest on a support surface, a receptacle in said base plate, a weighing unit having a portion thereof complementally shaped with respect to said receptacle and adapted to be received therein when said scale is operatively disposed, and an upper plate removably engagable with said weighing unit and in spaced parallel relation to said base plate when said scale is operatively disposed, said weighing unit having weight read-out means thereon readable from above said upper plate when said upper plate is operatively disposed.

2. Apparatus in accordance with claim 1, wherein said upper plate has an opening therein, and an upper portion of said weighing unit extending into said opening, said weight read-out means being disposed on said upper portion.

3. Apparatus in accordance with claim 2, wherein said weight read-out means comprises a rotatable pointer and numerical scale.

4. Apparatus in accordance with claim 1 wherein said weighing unit has a main body portion having a first transverse dimension, an upper body portion having a transverse dimension less than said first transverse dimension, and a shoulder portion interconnecting said main and upper body portions, said upper plate having an opening therein, and said upper body portion extending into said opening when said upper plate is operatively disposed so that said upper plate rests on said shoulder portion when said upper plate is operatively disposed.

5. Apparatus in accordance with claim 4, wherein said main body portion of said weighing unit has a cross-sectional shape corresponding to the cross-sectional shape of said receptacle, said weighing unit being removably friction-fitted within said receptacle and said upper plate being removably friction-fitted to said upper body portion.

6. Apparatus in accordance with claim 5, wherein said weighing unit, said receptacle and said opening are generally circular in cross-section.

7. Apparatus in accordance with claim 3, wherein said weight read-out means comprises a rotatable pointer and numerical scale, said weight read-out means being disposed on said upper body portion and facing upwardly for reading from above said upper plate.

8. Apparatus in accordance with claim 7, wherein said main body portion of said weighing unit has a cross-sectional shape corresponding to the cross-sectional shape of said receptacle, said weighing unit being removably friction-fitted within said receptacle and said upper plate being removably friction-fitted to said upper body portion.

9. Apparatus in accordance with claim 8, wherein said receptacle is a recess opening on the upper surface of said base plate, and extending there-through.

* * * * *